US012633042B2

(12) United States Patent
Habuta et al.

(10) Patent No.: US 12,633,042 B2
(45) Date of Patent: May 19, 2026

(54) IMAGE PROCESSING METHOD, APPARATUS, AND PROGRAM PRODUCT

(71) Applicants: DENSO CORPORATION, Kariya-city (JP); TOYOTA JIDOSHA KABUSHIKI KAISHA, Toyota (JP)

(72) Inventors: Rie Habuta, Kariya-city (JP); Yuki Yamamoto, Nagakute (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 18/770,383

(22) Filed: Jul. 11, 2024

(65) Prior Publication Data

US 2025/0022213 A1     Jan. 16, 2025

(30) Foreign Application Priority Data

Jul. 12, 2023     (JP) ................................. 2023-114590

(51) Int. Cl.
| | |
|---|---|
| *G06T 15/00* | (2011.01) |
| *B60R 1/23* | (2022.01) |
| *G06T 3/16* | (2024.01) |
| *G06T 7/20* | (2017.01) |

(Continued)

(52) U.S. Cl.
CPC .............. *G06T 15/205* (2013.01); *B60R 1/23* (2022.01); *G06T 3/16* (2024.01); *G06T 7/20* (2013.01); *G06T 7/70* (2017.01); *B60R 2300/607* (2013.01); *G06T 2207/30261* (2013.01)

(58) Field of Classification Search
CPC ........... G06T 15/205; G06T 3/16; G06T 7/20; G06T 7/70; G06T 2207/30261; B60R 1/23; B60R 2300/607; B60R 1/27
See application file for complete search history.

(56) References Cited

U.S. PATENT DOCUMENTS

| | | | |
|---|---|---|---|
| 7,161,616 B1 * | 1/2007 | Okamoto | .............. G06T 15/205 |
| | | | 348/E7.086 |
| 2003/0108222 A1 * | 6/2003 | Sato | ......................... G06T 3/40 |
| | | | 382/104 |

(Continued)

FOREIGN PATENT DOCUMENTS

| | | |
|---|---|---|
| JP | 2010-231276 A | 10/2010 |
| JP | 6724821 B2 | 7/2020 |
| JP | 2021-118435 A | 8/2021 |

*Primary Examiner* — Sarah Lhymn
(74) *Attorney, Agent, or Firm* — Precision Patents, P.C.

(57) ABSTRACT

A processor of an image processing apparatus executes computer-program instructions to accordingly (i) define a three-dimensional virtual projection plane structure that includes a bottom plane parallel to a road surface and a wall plane raised to extend from an outer periphery of a bottom plane, (ii) determine a location of a virtual viewpoint above a vehicle on an orthogonal plane, the orthogonal plane being orthogonal to a virtual line connecting between an object located in a peripheral field of view and the vehicle, (iii) determine a direction of a line of view from the virtual viewpoint toward the wall plane, (iv) convert at least one image of the peripheral field of view captured by an imaging unit into a bird's-eye view image being viewed in the line of view, and (iv) instruct the display device to display the bird's-eye view image thereon.

9 Claims, 6 Drawing Sheets

(51) Int. Cl.
*G06T 7/70*     (2017.01)
*G06T 15/20*    (2011.01)

(56)              References Cited

U.S. PATENT DOCUMENTS

| | | | | | |
|---|---|---|---|---|---|
| 2009/0073263 | A1* | 3/2009 | Harada | ................... | G06T 3/047 |
| | | | | | 348/148 |
| 2010/0245573 | A1* | 9/2010 | Gomi | .................... | H04N 7/181 |
| | | | | | 348/148 |
| 2011/0001826 | A1* | 1/2011 | Hongo | ................... | H04N 7/183 |
| | | | | | 348/148 |
| 2013/0033494 | A1* | 2/2013 | Kiyota | ................... | B66C 15/00 |
| | | | | | 345/420 |
| 2014/0218531 | A1* | 8/2014 | Michiguchi | ........... | G01S 15/931 |
| | | | | | 348/148 |
| 2015/0294160 | A1* | 10/2015 | Takahashi | ............. | G06T 11/206 |
| | | | | | 382/104 |
| 2015/0334301 | A1* | 11/2015 | He | ........................ | G06T 3/4038 |
| | | | | | 348/36 |
| 2017/0050566 | A1* | 2/2017 | Yamashita | ............. | H04N 5/265 |
| 2018/0063514 | A1* | 3/2018 | Mizuno | ..................... | G06F 3/14 |
| 2019/0135180 | A1* | 5/2019 | Watatsu | ................... | B60R 1/12 |
| 2019/0215465 | A1* | 7/2019 | Hayashi | .............. | H04N 5/2628 |
| 2020/0186767 | A1* | 6/2020 | Watanabe | ................ | G08G 1/16 |
| 2020/0380753 | A1* | 12/2020 | Adachi | ................... | G06T 15/20 |
| 2021/0107465 | A1* | 4/2021 | Hiei | ........................ | G08G 1/168 |
| 2024/0096006 | A1* | 3/2024 | Okonogi | ................. | H04N 5/74 |

* cited by examiner

FIG.8

IMAGE PROCESSING METHOD, APPARATUS, AND PROGRAM PRODUCT

CROSS REFERENCE TO RELATED APPLICATION

This application is based on and claims the benefit of priority from Japanese Patent Application No. 2023-114590 filed on Jul. 12, 2023, the disclosure of which is incorporated in its entirety herein by reference.

TECHNICAL FIELD

The present disclosure relates to image processing methods, image processing apparatuses, and image processing program products.

BACKGROUND

US Patent Publication No. 10855934 corresponding to Japanese Patent Publication No. 6724821 discloses a bird's-eye image generating apparatus for intuitively grasping positional relationships between a vehicle, which includes the bird's-eye image generating apparatus, and an obstacle located around the vehicle. The bird's-eye image generating apparatus includes an image data acquisition unit, an obstacle information acquisition unit, a bird's-eye view image generation unit, and a display control unit.

The image data acquisition unit captures images of a periphery of the vehicle to accordingly acquire periphery image data.

The obstacle information acquisition unit detects an obstacle around the vehicle to accordingly acquire positional information about the detected obstacle.

The bird's-eye view image generation unit converts, based on the positional information about the detected obstacle, a viewpoint of each of the peripheral images, and thereafter combines the peripheral images whose viewpoints have been converted, with one another to accordingly generate a bird's eye-image that enables overview of the vehicle and the obstacle.

Specifically, the bird's-eye view image generation unit converts, based on the positional information about the detected obstacle, the viewpoint of each of the peripheral images such that a converted virtual viewpoint of the combined peripheral image, i.e., the bird's-eye view image, is located on a line extending from the vehicle to the detected obstacle. The display control unit displays, on a display panel, the bird's-eye image generated by the bird's-eye view image generation unit.

SUMMARY

If such an obstacle detected by the obstacle information acquisition unit has a certain level of height, such as a pole or the like, the bird's-eye view image, which has the converted virtual viewpoint located on the line extending from the vehicle to the detected obstacle, may make it difficult for one or more occupants of the vehicle, who are viewing the bird's-eye view image, to grasp a sense of distance to the detected obstacle. That is, the bird's-eye image generating apparatus disclosed in the patent publication may result in one or more occupants of the vehicle being unlikely to intuitively grasp a positional relationship between the vehicle and the detected obstacle.

From this viewpoint, the present disclosure seeks to provide technologies, which generate surrounding images, such as bird's-eye view images, each of which has a higher level of intuitive viewability.

A first aspect of the present disclosure is an image processing apparatus to be installed in a vehicle located on a road surface. The vehicle includes a display device and an imaging unit having a predetermined peripheral field of view determined around the vehicle. The image processing apparatus includes a memory device that stores computer-program instructions, and a processor configured to execute the computer-program instructions to accordingly (I) Define a three-dimensional virtual projection plane structure that includes a bottom plane parallel to the road surface and a wall plane raised to extend from an outer periphery of the bottom plane (II) Determine a location of a virtual viewpoint above the vehicle on an orthogonal plane, the orthogonal plane being orthogonal to a virtual line connecting between an object located in the peripheral field of view and the vehicle (III) Determine a direction of a line of view from the virtual viewpoint toward the wall plane (IV) Convert at least one image of the peripheral field of view captured by the imaging unit into a bird's-eye view image being viewed in the line of view (V) Instruct the display device to display the bird's-eye view image thereon A second aspect of the present disclosure is an image processing method for a vehicle located on a road surface. The vehicle includes a display device and an imaging unit having a predetermined peripheral field of view determined around the vehicle. The image processing method includes (I) Defining a three-dimensional virtual projection plane structure that includes a bottom plane parallel to the road surface and a wall plane raised to extend from an outer periphery of the bottom plane (II) Determining a location of a virtual viewpoint above the vehicle on an orthogonal plane, the orthogonal plane being orthogonal to a virtual line connecting between an object located in the peripheral field of view and the vehicle (III) Determining a direction of a line of view from the virtual viewpoint toward the wall plane (IV) Converting at least one image of the peripheral field of view captured by the imaging unit into a bird's-eye view image being viewed in the line of view (V) Instructing the display device to display the bird's-eye view image thereon A third aspect of the present disclosure is a program product for a vehicle located on a road surface. The vehicle includes a display device and an imaging unit having a predetermined peripheral field of view determined around the vehicle. The program product includes a non-transitory storage medium that stores computer-program instructions, and a processor for executing the computer-program instructions stored in the non-transitory storage medium. The computer-program instructions cause the processor to (I) Define a three-dimensional virtual projection plane structure that includes a bottom plane parallel to the road surface and a wall plane raised to extend from an outer periphery of the bottom plane (II) Determine a location of a virtual viewpoint above the vehicle on an orthogonal plane, the orthogonal plane being orthogonal to a virtual line connecting between an object located in the peripheral field of view and the vehicle (III) Determine a direction of a line of view from the virtual viewpoint toward the wall plane (IV) Convert at least one image of the peripheral field of view captured by the imaging unit into a bird's-eye view image being viewed in the line of view (V) Instruct the display device to display the bird's-eye view image thereon Note that each parenthesized reference character assigned to a corresponding element in the present disclosure merely represents an example of a relationship between the corresponding element and a corresponding specific element described in exemplary embodiment described later, and therefore the present disclosure is not limited to the parenthesized reference characters.

BRIEF DESCRIPTION OF THE DRAWINGS

Other aspects of the present disclosure will become apparent from the following description of embodiments with reference to the accompanying drawings in which:

FIG. 8 is a diagram schematically illustrating an example of a surrounding image displayed on a display device illustrated in FIG. 2.

DETAILED DESCRIPTION OF EMBODIMENT

The following describes an exemplary embodiment of the present disclosure with reference to accompanying drawings. Various modifications applicable to the exemplary embodiment will be collectively described after descriptions of the exemplary embodiment in order to avoid disturbing of the understanding of the exemplary embodiment.

Figure 1:
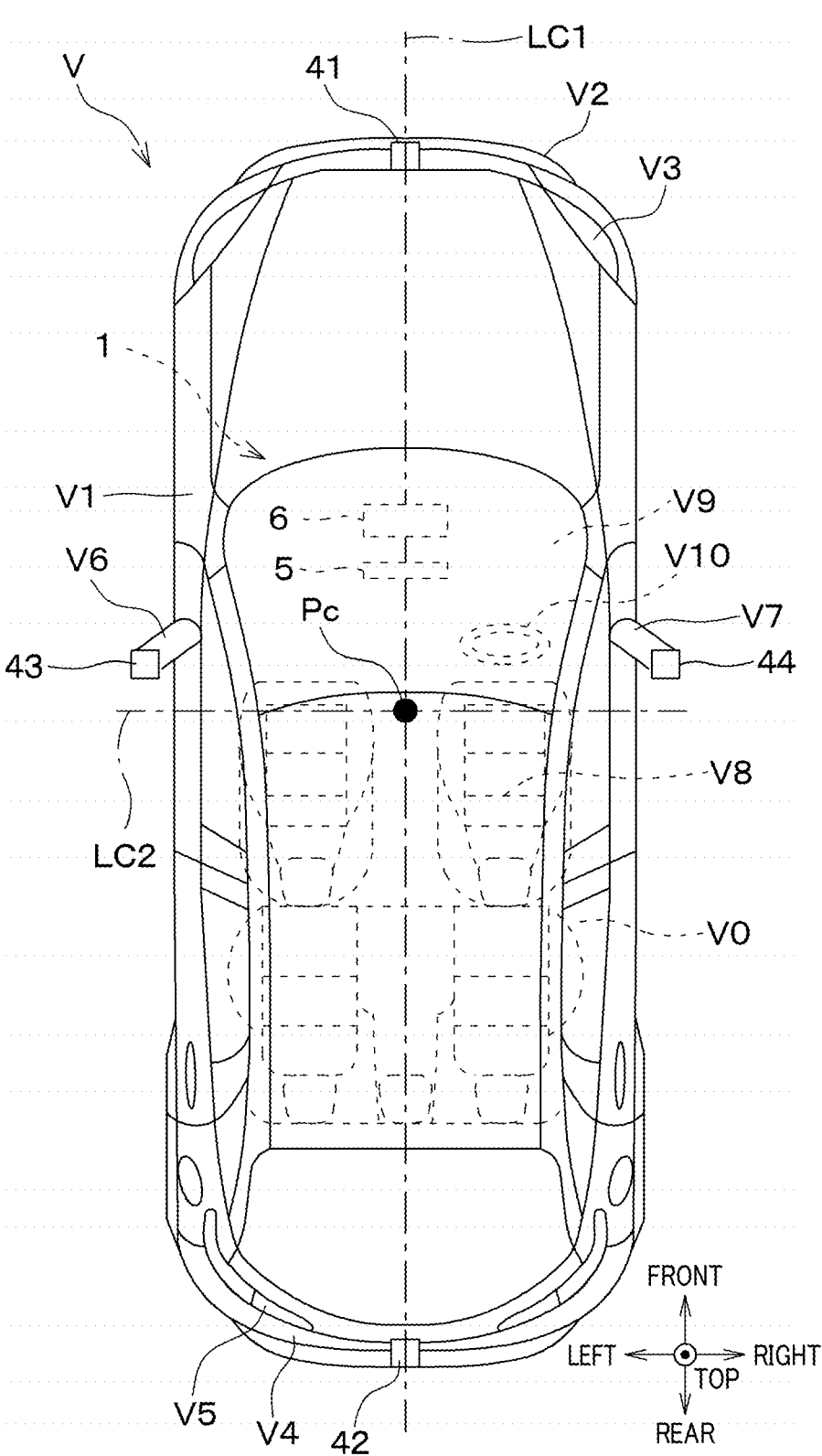
FIG. 1 is a plan view illustrating an example of a schematic configuration of a vehicle in which a vehicular system equipped with an image processing apparatus according to an exemplary embodiment is installed.
Figure 2:
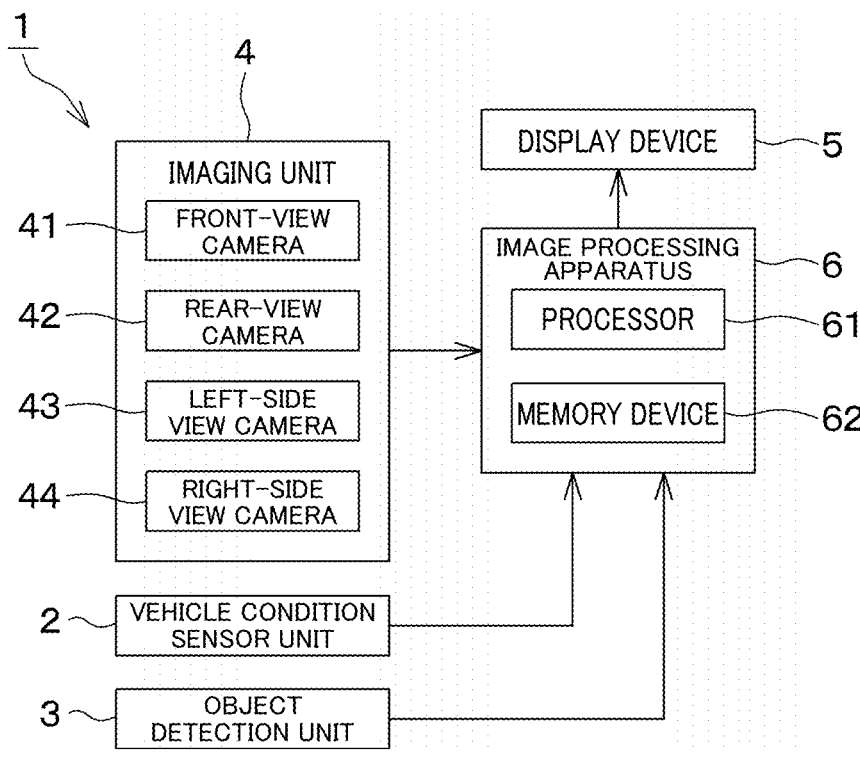
FIG. 2 is a block diagram illustrating a schematic hardware configuration of the vehicular system.

First, the following describes an overall configuration of a vehicular system 1 according to the exemplary embodiment with reference to FIGS. 1 and 2.

The vehicular system 1 is configured as a vehicle-surroundings monitor system, which is used to be installed in a vehicle V, such as a motor vehicle or the like traveling in a road. The vehicular system 1, which is installed in, for example, an occupant compartment V0 of the vehicle V, is configured to monitor one or more obstacles located around the vehicle V.

The vehicle V has a body V1 that has a box shape configured to define the occupant compartment V0 thereinside. That is, the body V1 is arranged to surround the occupant compartment V0.

In the vehicle V, a front direction, a rear direction, a left direction, a right direction, and a topside direction, i.e., an upper direction, and a downside direction, i.e., a lower direction, are defined as illustrated in FIG. 1. These directions illustrated in FIG. 1 are defined with reference to a driver in the vehicle V that is traveling forward in a straight road paved on a horizontal ground. The vehicle V has a center point Pc. The center point Pc of the vehicle V is a center point of the vehicle V in plan view, in other words, the center point Pc of the vehicle V is a center point of the vehicle V when the vehicle V is viewed from above. The center point Pc of the vehicle V will also be referred to as a vehicle center point Pc.

The vehicle V has a first center line LC1 defined as a virtual line that passes through the center point Pc and extends in the front-rear direction, i.e., the longitudinal direction, of the vehicle V. The vehicle V has a second center line LC2 defined as a virtual line that passes through the center point Pc and extends in the left-right direction, i.e., the width direction, of the vehicle V.

The body V1 has a front-end portion, a rear-end portion, a left-side portion, and a right-side portion. The vehicle V includes a front bumper V2 and headlights V3 that are mounted to the front end portion of the body V1. The vehicle V includes a rear bumper V4 and brake lamps V5 that are mounted to the rear end portion of the body V1.

The vehicle V includes a left-side door mirror, i.e., a left-side mirror, V6 attached to the left-side portion of the body V1. The vehicle V includes a right-side door mirror, i.e., a right-side mirror, V7 attached to the right-side portion of the body V1.

The vehicle V includes a dashboard V9 and a steering wheel V10 provided in front of a driver's seat V8 in the body V1.

The vehicular system 1 includes, as illustrated in FIG. 2, a vehicle condition sensor unit 2, an object detection sensor unit 3, an imaging unit 4, a display device 5, and an image processing apparatus 6.

The following describes an example of a specific hardware configuration and/or a functional configuration of each component 2 to 6 of the vehicular system 1 in sequence.

The vehicle condition sensor unit 2 is configured to measure a parameter, such as an information item and/or a signal, indicative a corresponding one of the traveling conditions of the vehicle V, and output the measured parameter, i.e., vehicle-condition parameter, to the image processing apparatus 6. The traveling conditions of the vehicle V can include, for example, physical quantities related to the behavior of the vehicle V, such as the speed of the vehicle V, and the angular speed of the vehicle V. Additionally, the traveling conditions of the vehicle V can include, for example, a current position of an accelerator pedal of the vehicle V operable by a driver of the vehicle V, a current position of a brake pedal of the vehicle V operable by a driver of the vehicle V, a current position of a shift lever of the vehicle V operable by a driver, and a steering angle of the steering wheel V10.

That is, the vehicle condition sensor unit 2 can include, for example, (i) a vehicle speed sensor for measuring the speed of the vehicle V, (ii) a yaw-rate sensor for measuring the angular speed, i.e., the yaw rate, of the vehicle V, (iii) an accelerator sensor for measuring the current position of the accelerator pedal, (iv) a brake sensor for measuring the current position of the brake pedal, (v) a shift position sensor for measuring the current position of the shift lever, a steering sensor for measuring a steering angle of the steering wheel V10 operated by a driver of the vehicle V, and other sensors; these sensors of the vehicle condition sensor unit 2 are required to control traveling of the vehicle V.

The object detection sensor unit 3 is configured to detect at least one object, such as at least one obstacle, located around the vehicle V, and output, to the image processing apparatus 6, information indicative of the detection results, i.e., object-related information on the detected at least one object. The object detection sensor unit 3 can include at least one type of known sensors capable of detecting one or more obstacles around the vehicle V, such as ultrasonic sensors, radar sensors, or laser-radar sensors; these sensors are installed in the vehicle V.

The imaging unit 4 is installed in the vehicle V, and is arranged to have a predetermined peripheral field of view determined around the vehicle V, i.e., determined close to the vehicle V, and capture images of the peripheral field of view to accordingly monitor one or more obstacles if the one or more obstacles appear in the captured images.

Specifically, the imaging unit 4 includes a front-view camera 41, a rear-view camera 42, a left-side view camera 43, and a right-side view camera 44.

The front-view camera 41 is mounted to the front end portion of the body V1, and has a predetermined front field of view with respect to the vehicle V; the front field of view can include, for example, a front region and both front left and front right regions with respect to the vehicle V. The front-view camera 41 is configured to capture images of the front field of view; these images will be referred to as front-view images. Each time when capturing a front-view image, the front-view camera 41 is configured to output, to the image processing apparatus 6, the captured front-view image in a data format.

The rear-view camera 42 is mounted to the rear end portion of the body V1, and has a predetermined rear field of view with respect to the vehicle V; the rear field of view can include, for example, a rear region and both rear left and rear right regions with respect to the vehicle V. The rear-view camera 42 is configured to capture images of the rear field of view; these images will be referred to as rear-view images. Each time when capturing a rear-view image, the rear-view camera 42 is configured to output, to the image processing apparatus 6, the captured rear-view image in a data format.

The left-side view camera 43 is mounted to the left-side door mirror V6, and has a predetermined left-side field of view with respect to the vehicle V; the left-side field of view can include, for example, a left-side region and both front left-side and rear left-side regions with respect to the vehicle V. The left-side view camera 43 is configured to capture images of the left-side field of view; these images will be referred to as left-side view images. Each time when capturing a left-side view image, the left-side view camera 43 is configured to output, to the image processing apparatus 6, the captured left-side view image in a data format.

The right-side view camera 44 is mounted to the right-side door mirror V7, and has a predetermined right field of view with respect to the vehicle V; the right-side field of view can include, for example, a right-side region and both front right-side and rear right-side regions with respect to the vehicle V. The right-side view camera 44 is configured to capture images of the left-side field of view; these images will be referred to as right-side view images. Each time when capturing a right-side view image, the right-side view camera 44 is configured to output, to the image processing apparatus 6, the captured right-side view image in a data format.

The peripheral field of view of the imaging unit 4 is therefore substantially comprised of the front field of view, the rear field of view, the left-side field of view, and the right-side field of view, in other words, the front field of view, the rear field of view, the left-side field of view, and the right-side field of view substantially constitute the peripheral field of view of the imaging unit 4. For this reason, the front-view image, rear-view image, left-side view image, and right-side image will also be referred to as peripheral-view images.

The display device 5 has a screen, and is arranged in the occupant compartment V0 of the vehicle V, and is configured to display, on the screen, various images viewable for one or more occupants including at least a driver of the vehicle V. Specifically, the display device 5 is mounted to the dashboard V9. The various images to be displayed on the screen of the display device 5 can include, for example, navigation images, and content images, such as televised images in response to a driver's second task other than driving tasks of the vehicle V during autonomous driving of the vehicle V. The various images to be displayed on the screen of the display device 5 can include, for example, images indicative of various information items, such as traffic-jam information and images captured by the imaging unit 4.

The image processing apparatus 6 is configured to apply one or more various image-processing tasks to the images captured by the imaging unit 4 to thereby generate processed images. Then, the image processing apparatus 6 is configured to output, to the display device 5, the processed images. When receiving the processed images outputted from the image processing apparatus 6, the display device 5 can display, on the screen, the processed images as the various images.

Specifically, the image processing apparatus 6 includes a processor 61 and a memory device 62 connected thereto. The processor 61, which can execute computer-program instructions stored in the memory device 62, is comprised of a Central Processing Unit (CPU) and/or a Micro Processing Unit (MPU). The memory device 62 can serve as a non-volatile non-transitory storage medium that stores the computer-program instructions, and various data items needed for the processor 61 to execute the computer-program instructions; the various data items can include various look-up tables. Specifically, the memory device 62 can include, for example, at least one type of Read-Only Memories (ROMs), flash memories, magnetic disk drives, and other similar storage devices.

The processor 61 can be configured as a single processor or an assembly of processing units.

The processor 61 is configured to read the computer-program instructions stored in the memory device 62, and execute the computer-program instructions, which causes the image processing apparatus 6 to perform various image-processing tasks.

Figure 3:
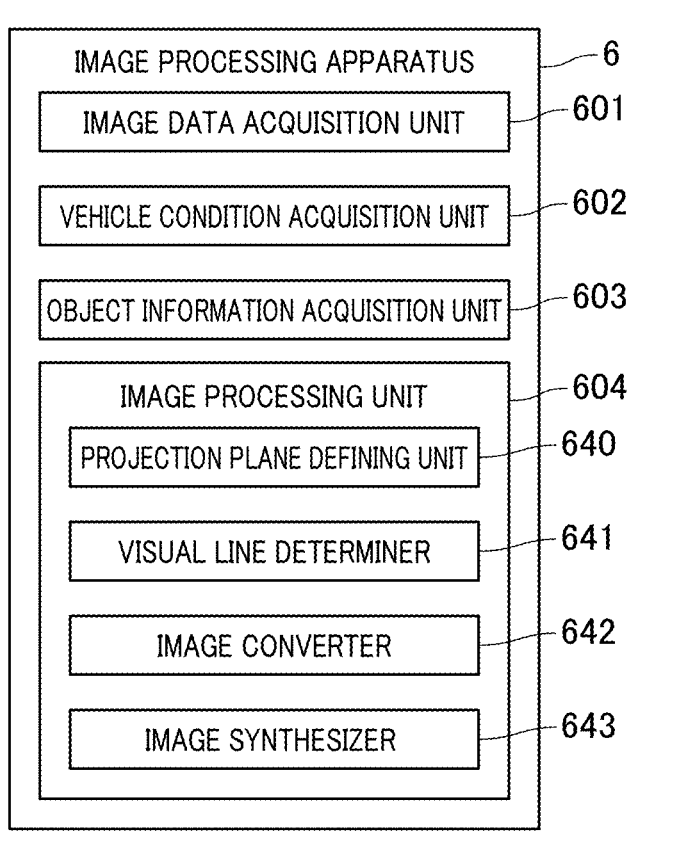
FIG. 3 is a block diagram illustrating a schematic functional configuration of the image processing apparatus illustrated in FIG. 2.

FIG. 3 is a block diagram schematically illustrating an example of a functional configuration of the image processing apparatus 6. Specifically, the processor 61 executes the computer-program instructions stored in the memory device 62 to accordingly implement various functions included in the image processing apparatus 6. FIG. 3 schematically illustrates the various functions implementable by the image processing apparatus 6.

Figure 4:
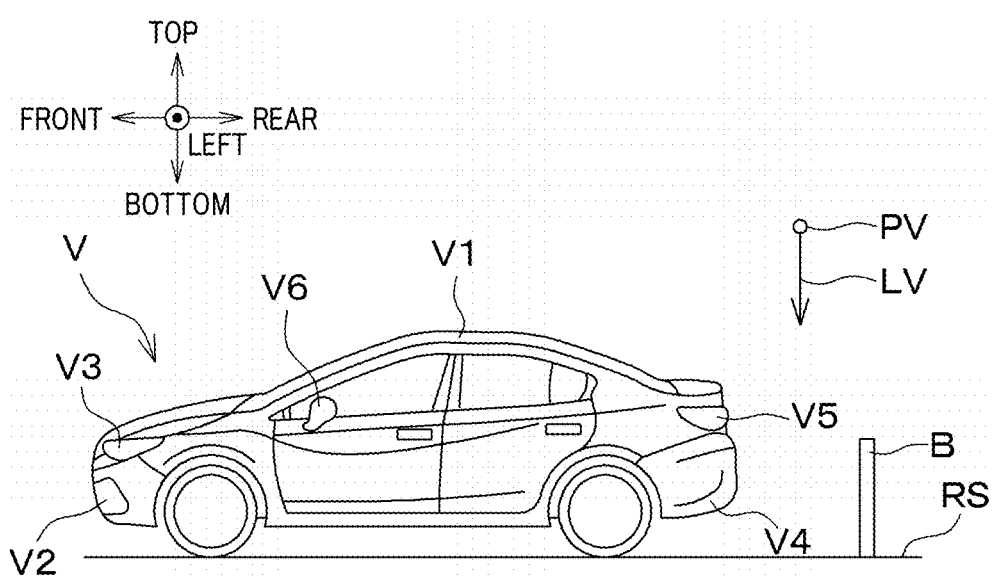
FIG. 4 is a side view of the vehicle, which illustrates a situation in which the image processing apparatus illustrated in FIG. 3 operates.
Figure 5:
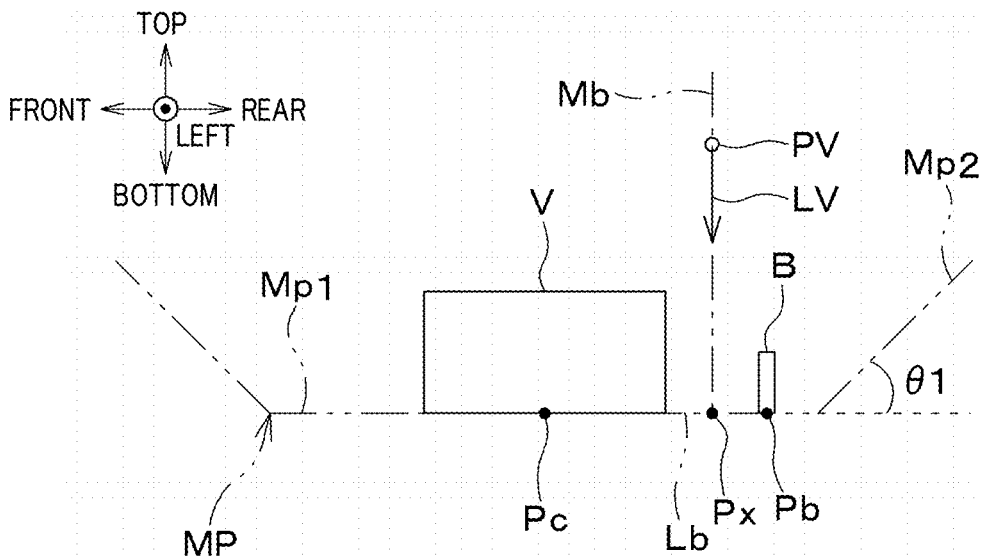
FIG. 5 is a conceptual diagram illustrating schematic operations of the image processing apparatus illustrated in FIG. 3.

FIG. 4 is a side view illustrating a situation where there is an object, i.e., an obstacle, B around the vehicle V. A front direction, a rear direction, a left direction, a right direction, and an upper direction illustrated in FIG. 4 match the respective front direction, rear direction, left direction, right direction, and upper direction illustrated in FIG. 1. FIGS. 5 to 8 illustrate an example of one or more image processing tasks applied on one or more captured images that include the object B.

The following describes an example of the functional configuration of the image processing apparatus 6.

The image processing apparatus 6 is configured to convert each of the images captured by the corresponding one of the cameras 41 to 44 of the imaging unit 4, which has an original viewpoint therefrom, into a corresponding one of viewpoint-converted images; each of the viewpoint converted images is viewed from a line of view LV from a predetermined virtual viewpoint PV. Then, the image processing apparatus 6 is configured to combine the viewpoint-converted images to one another to thereby generate a bird's-eye image, and instruct the display device 5 to display, on the screen, the bird's-eye image.

Specifically, the image processing apparatus 6 includes, as illustrated in FIG. 3, an image data acquisition unit 601, a vehicle condition acquisition unit 602, an object information acquisition unit 603, and an image processing unit 604.

The image data acquisition unit 601 is configured to acquire, i.e., receive, data items of the peripheral-view images, which include the front-view image, rear-view image, left-side view image, and right-side view image, from the imaging unit 4. Then, the image data acquisition unit 601 is configured to store the received data items of the peripheral-view images for a predetermined period.

The vehicle condition acquisition unit 602 is configured to acquire, from the vehicle condition sensor unit 2, the vehicle-condition parameters, each of which represents the corresponding one of the traveling conditions of the vehicle V.

The object information acquiring unit 603 is configured to determine whether an object B is located in the peripheral field of view of the imaging unit 4 in accordance with the received data items of the peripheral-view images, and acquire, upon determination that the object B is located in the peripheral field of view of the imaging unit 4, positional shape information about the object B based on the object-related information outputted from the object detection sensor unit 3. The positional shape information about the object B can include, for example, a location in the peripheral field of view and a three-dimensional shape of the object B, such as a solid figure or shape that has three dimensions of length, width, and height.

The image processing unit 604 is configured to generate a surrounding monitor image based on, for example, (i) the data items of the peripheral-view images acquired by the imaging unit 4, (ii) the vehicle-condition parameters acquired by the vehicle condition acquisition unit 602, and (iii) the positional shape information about the object B acquired by the object information acquiring unit 603.

Specifically, the image processing unit 604 includes, for example, a projection plane defining unit 640, a visual line determiner 641, an image converter 642, and an image synthesizer 643.

The projection plane defining unit 640 is configured to define a virtual three-dimensional (3D) projection plane structure, which is described detail later, onto which a bird's-eye view image is to be projected.

The visual line determiner 641 is configured to set the line of view LV. Specifically, the visual line determiner 641 is configured to determine a location of the virtual viewpoint PV above the vehicle V, and set the direction of the line of view LV from the virtual viewpoint PV.

The image converter 642 is configured to convert each of the peripheral-view images, i.e., the front-view image, the rear-view image, the left-side view image, and the right-side view image, acquired by the imaging unit 4 into a corresponding one of viewpoint-converted images; each of the viewpoint-converted images is viewed from the line of view LV from the virtual viewpoint PV. Then, the image converter 642 is configured to combine the viewpoint-converted images to one another to thereby generate a bird's-eye image, i.e., data of the bird's-eye image.

The image synthesizer 643 is configured to synthesize, i.e., superimpose, various display contents, on the data of the bird's-eye image to accordingly generate surrounding-monitor image data to be displayed on the screen of the display device 5.

Next, the following describes how the image processing apparatus 6 serves as the functional units 601 to 604 to perform surrounding-image data generating operations with reference to FIGS. 4 to 9. That is, the processor 61 of the image processing apparatus 6 performs a surrounding-image data generating routine illustrated in FIG. 9 to accordingly perform the image data generating operations. For example, the processor 61 of the image processing apparatus 6 is configured to execute, in accordance with program instructions stored in the memory device 62, the surrounding-image data generating routine illustrated in FIG. 2 every predetermined cycle.

Hereinafter, the image processing apparatus 6 set forth above, an image processing method carried out by the surrounding-image data generating routine, and an image processing program product that can be carried out by the processor 61 according to the predetermined embodiment will also be collectively referred to as merely the predetermined embodiment.

When starting the surrounding-image data generating routine, the processor 61 serves as, for example, the projection plane defining unit 640 to define a virtual three-dimensional (3D) projection plane structure Mp onto which a bird's-eye image is to be projected in step S100. Specifically, the 3D projection plane structure Mp is comprised of a virtual flatted bottom plane Mp1, and a virtual peripheral wall Mp2 raised to extend from the outer periphery of the bottom plane Mp1.

The bottom plane Mp1 according to the exemplary embodiment has a substantially rectangular shape, and has a first pair of sides parallel to the first center line LC1, a second pair of sides parallel to the second center line LC2, and four corners each made by a corresponding adjacent pair of the sides. Each corner of the bottom plane Mp1 has a rounded shape with a predetermined radius of curvature.

The virtual peripheral wall Mp2 has a substantially annular or ring shape. That is, the peripheral wall Mp2 is comprised of four wall planes raised to extend from the respective sides of the bottom plane Mp1; the four wall planes are joined to have a substantially rectangular ring shape. Each wall plane of the peripheral wall Mp2 extends from the corresponding side of the bottom plane Mp1 to expand, i.e., flare, diagonally outward.

Each wall plane of the peripheral wall Mp2 and the corresponding side of the bottom plane Mp1 has a predetermined angle θ1, which will be referred to as a raised angle $\theta1$; the raised angle $\theta1$ can be set to be within substantially a range from 30° to 60° inclusive, preferably to 45°.

The joint portion between each wall plane of the peripheral wall Mp2 and the corresponding side of the bottom plane Mp1 can be rounded, and each joint portion made by a corresponding adjacent pair of the wall planes of the peripheral wall Mp2 can be rounded.

The peripheral wall Mp2 can be defined as a portion of the 3D projection plane structure Mp; the portion has a height of equal to or more than a predetermined height of, for example, 0.2 m in actual size of the vehicle V.

As described above, the 3D projection plane structure Mp according to the exemplary embodiment has a bathtub-like shape having an open top in plan view.

Next, the processor 61 serves as, for example, the image data acquisition unit 601 to acquire the data items of the peripheral-view images, which include the front-view image, rear-view image, left-side view image, and right-side view image, from the imaging unit 4 in step S101A1.

Following the operation in step S101A1, the processor 61 serves as, for example, the object information acquiring unit 603 to repeatedly determine whether an object B, which has a certain level of height, is located in the peripheral field of view of the imaging unit 4 in accordance with the received data items of the peripheral-view images in step S101A2.

Then, the processor 61 serves as, for example, the object information acquiring unit 603 to acquire, upon determination that the object B is located in the peripheral field of view of the imaging unit 4, the positional shape information about the object B based on the object-related information outputted from the object detection sensor unit 3 in step S101A2.

FIGS. 4 to 8 illustrate a case where the object B detected by the processor 61 is located behind the right side of the vehicle V on a road surface RS; the object B is an obstacle having a pole-like shape. Specifically, the pole-like object B has a certain level of height from the road surface RS, which is within the range from 65 cm to 80 cm inclusive.

Following the operation in step S101A2, the processor 61 serves as, for example, the visual line determiner 641 to determine an object-directional line Lb that is a virtual line connecting between the object B and a reference point of the vehicle V in step S102A1. Specifically, the processor 61 determines, as the object-directional line Lb, a virtual line, i.e., a virtual shortest line, connecting between the center point Pc of the vehicle V selected as the reference point thereof and an object center point Pb and passing through a space defined between the object B and the vehicle V. The object center point Pb is defined as a substantially center point of the object B in plan view, in other words, the center point Pb of the object B is a center point of the object B when the object B is viewed from above. That is, the object-directional line Lb is a line extending horizontally and being perpendicular to the vertical direction.

Next, in step S102A2, the processor 61 serves as the visual line determiner 641 to determine an orthogonal plane Mb that is a virtual plane orthogonal to the object-directional line Lb; the orthogonal plane Mb passes through an internally dividing point Px that divides internally the object-directional line Lb. The internally dividing point Px may be typically a middle point of the object-directional line Lb. That is, the orthogonal plane Mb may typically pass through the middle position of the object-directional line Lb. The orthogonal plane Mb according to the exemplary embodiment is defined as a vertical plane perpendicular to the plane of the horizon.

Following the operation in step S102A2, the processor 61 serves as, for example, the visual line determiner 641 to determine, in step S103, the location of the virtual viewpoint PV above the vehicle V and the direction the line of view LV from the virtual viewpoint PV such that (I) The virtual viewpoint PV and the line of view LV are included in the orthogonal plane Mb (II) The line of view LV from the virtual viewpoint PV is directed toward a selected one of the four wall planes of the peripheral wall Mp2 3, the selected one of the four wall planes of the peripheral wall Mp2 being the closest to the object B in all the four wall planes (III) at least one characteristic-shape portion of the vehicle V appears in the peripheral field of view of the imaging unit 4

The selected one of the four wall planes of the peripheral wall Mp2, which is the closest to the object B in all the four wall planes, will be referred to as a first wall plane Mp21. Additionally, another one of the remaining three wall planes of the peripheral wall Mp2, which is closer to the object B than any other two wall planes and adjacent to the first wall plane Mp21, will be referred to as a second wall plane Mp22.

That is, assuming that a distance, i.e., a shortest distance, between the object B and the first wall plane Mp21 will be referred to as D1, and a distance, i.e., a shortest distance, between the object B and the second wall plane Mp22 will be referred to as D2, the distance D2 is longer than the distance D1.

Figures 6, 7:
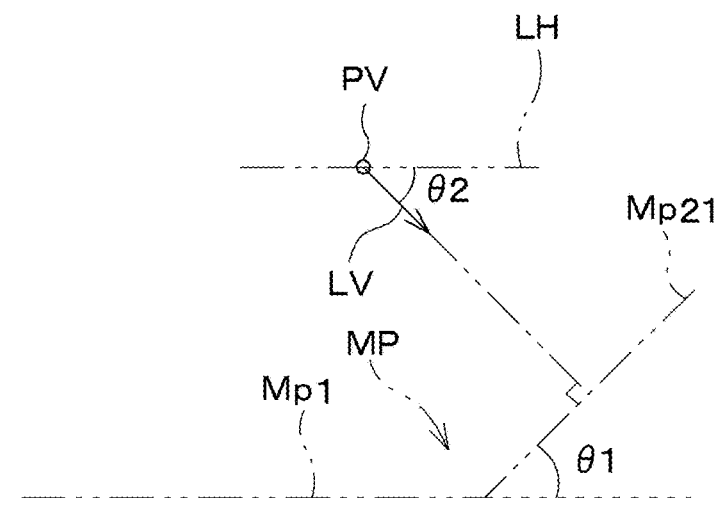
FIG. 6 is a conceptual diagram illustrating the schematic operations of the image processing apparatus illustrated in FIG. 3.
FIG. 7 is a conceptual diagram illustrating the schematic operations of the image processing apparatus illustrated in FIG. 3.

In particular, the visual line determiner 641 of the exemplary embodiment is configured to determine the direction of the line of view, i.e., the visual line, LV toward the first wall plane Mp21 (see FIGS. 6 and 7).

The at least one characteristic-shape portion of the vehicle V enables the location of the at least one characteristic-shape portion in the vehicle V to be likely to be visually recognizable. For example, the at least one characteristic-shape portion of the vehicle V can be selected from at least one of, for example, (i) the center point Pc of the vehicle V, (ii) an outer edge of the body V1, (iii) the front bumper V2, (iv) the headlights V3, (v) the rear bumper V4, (vi) the brake lamps V5, (vii) the left-side door mirror V6, (viii) the right-side door mirror V7, and (ix) the driver's seat V8.

Following the operation in step S103, the processor 61 serves as, for example, the visual line determiner 641 to determine an angle of depression $\theta2$ of the line of view LV from the virtual viewpoint PV in step S104. That is, the angle of depression $\theta2$ is defined as an angle formed by the line of view LV and a horizontal line LH passing through the virtual viewpoint PV in step S104.

FIG. 7, which is a cross section along the orthogonal plane Mb in FIG. 6, shows that the visual line determiner 641 determines the angle of depression $\theta2$ to an angle that causes, on the orthogonal plane Mb, the line of view LV to be perpendicular to the first wall plane Mp21. That is, the visual line determiner 641 sets the angle of depression $\theta2$ to an angle substantially defined by $\theta2 \approx 90 - \theta01$. That is, if the raised angle $\theta1$ is set to 45°, the visual line determiner 641 sets the angle of depression $\theta2$ to substantially 45°.

Following the operation in step S104, the processor 61 serves as, for example, the image converter 642 to perform a viewpoint conversion task in step S105A1.

The viewpoint conversion task in step S105A1 for example converts, based on the line of view LV and the virtual point PV, the data items of the peripheral-view images into view-point converted peripheral-view images, projected on the projection plane structure Mp, thus generating data of a bird's-eye image, i.e., bird's-eye image data.

Following the operation in step S105A1, the processor 61 serves as the image synthesizer 643 to perform a synthesis task of synthesizing, i.e., superimposing, on the bird's-eye image data, image-display contents, such as a graphic polygon representing the outline of the vehicle V and grid lines used to create the scale of contents displayed in the bird's-eye image data, on predetermined respective locations of the projection map Mp to accordingly generate surrounding-image data that visually shows the surroundings of the vehicle V in step S105A2.

Information about each of the viewpoint conversion task and the synthesis task can be substantially similar to that disclosed in each of Japanese Patent Application Publication No. 2011-182059, US patent publication No. 11258963 corresponding to Japanese Patent Application Publication No. 2019-153138, and Japanese Patent Application Publication No. 2021-118435 except for the location of the virtual viewpoint PV and the direction of the line of view LV, and the configuration of the projected plane structure Mp. The disclosure of each of Patent Publications 2011-182059, 11258963 (2019-153138), and 2021-118435 is incorporated in its entirety herein by reference. More detailed descriptions of the viewpoint conversion task and the synthesis task are therefore omitted in the present disclosure.

Following the operation in step S105A2, the processor 61 serves as, for example, the image synthesizer 643 to output, to the display device 5, the surrounding-image data and instructs the display device 5 to display a surrounding image based on the surrounding-image data on the screen thereof, and thereafter the processor 61 terminates the surrounding-image data generating routine in step S106.

Figure 8:
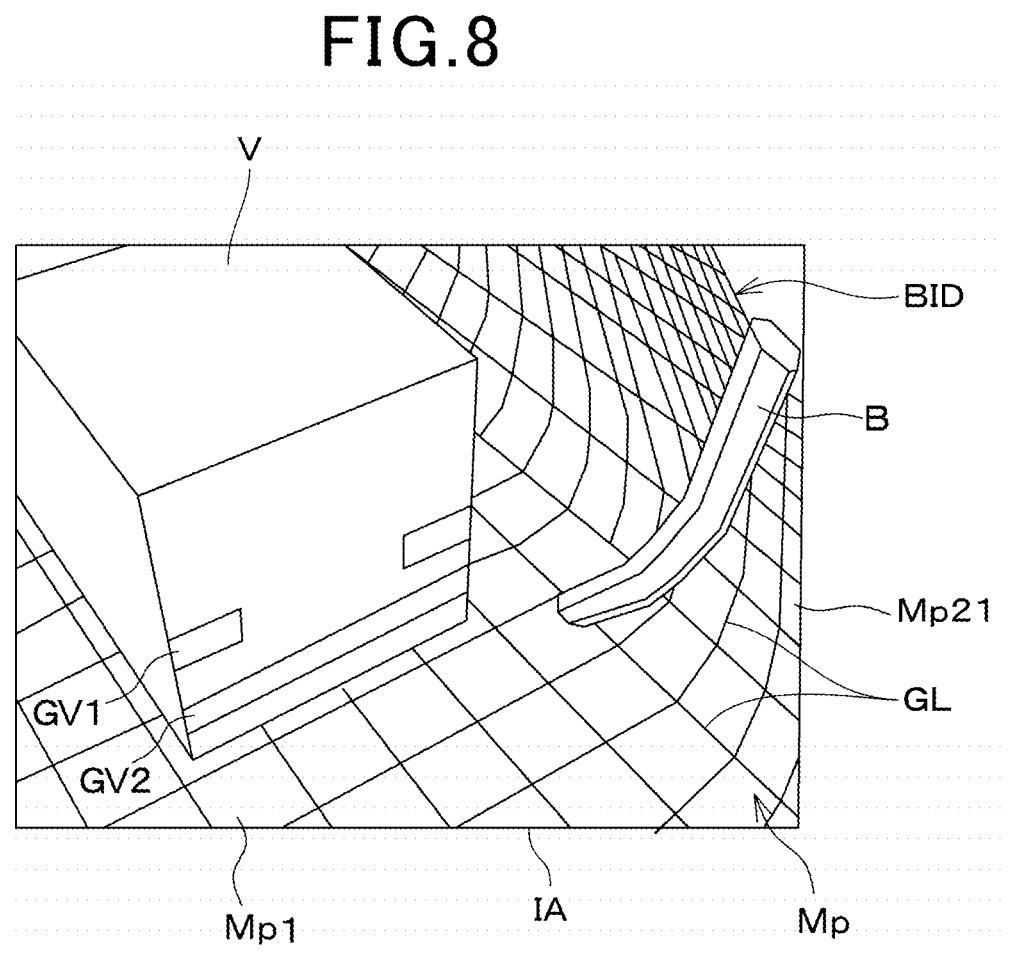

FIG. 8 illustrates a schematic example of the surrounding image displayed on the screen of the display device 5. The surrounding image IA illustrated in FIG. 8 includes (i) the bird's-eye image BID, (ii) the graphic polygon representing the vehicle V around which the bird's-eye image BID is located, (iii) one of the brake lamps of the vehicle V as a first characteristic-shape portion GV1 of the vehicle V, (iv) the rear bumper of the vehicle V as a second characteristic-shape portion GV2 of the vehicle V, and (v) the grid lines GL.

As described above, the image processing apparatus 6 according to the exemplary embodiment is configured to determine the location of the virtual viewpoint PV and the direction of the line of view LV, which enable, when one or more occupants view a bird's-eye view image based on the virtual viewpoint PV and the line of view LV, the one or more occupants to likely to grasp a sense of distance from the vehicle V to the object B, which may become an obstacle.

Specifically, the image processing apparatus 6 according to the exemplary embodiment is configured to determine the location of the virtual viewpoint PV in the orthogonal plane Mb that is orthogonal to the object-directional line Lb that is a virtual line connecting between the object B and the vehicle V.

Additionally, the image processing apparatus 6 according to the exemplary embodiment is configured to determine that the line of view LV from the virtual viewpoint PV is directed to be diagonally downward toward the wall plane Mp2 of the projection plane structure Mp.

The above configurations of the image processing apparatus 6 enable the object B having a certain level of height to be sterically displayed in the surrounding image displayed on the screen of the display device 5, resulting in one or more occupants, who view the surrounding image, being likely to grasp, from the surrounding image, a sense of distance from the vehicle V to the object B. Accordingly, the image processing apparatus 6 makes it possible to display, on the screen of the display device 5, the surrounding image that has a higher level of intuitive viewability thereof.

The image processing apparatus 6 according to the exemplary embodiment is configured to determine the direction of the line of view LV toward the first wall plane Mp21, which is the closest to the object B. This configuration results in, as illustrated in FIG. 8, one or more occupants, who view the surrounding image, being likely to grasp, from the surrounding image, a sense of distance from the vehicle V to the object B. Alternatively, the image processing apparatus 6 according to the exemplary embodiment can be configured to determine the direction of the line of view LV toward the second wall plane Mp22, which is the closest to the object B in the remaining three wall planes except the first wall plane Mp21. This configuration also results in one or more occupants, who are viewing the surrounding image, more easily grasping, from the surrounding image, a sense of distance from the vehicle V to the object B. As compared with the alternative, the above configuration of the image processing apparatus 6, which determines the direction of the line of view LV toward the first wall plane Mp21, makes it possible for one or more occupants to grasp a sense of distance from the vehicle V to the object B more intuitively.

The image processing apparatus 6 according to the exemplary embodiment is configured to determine the angle of depression $\theta 2$ of the line of view LV from the virtual viewpoint PV to an angle that causes, on the orthogonal plane Mb, the line of view LV to be perpendicular to the first wall plane Mp21. Specifically, the visual line determiner 641 sets the angle of depression $\theta 2$ to approximately 45° if the raised angle $\theta 1$ is set to 45°. This results in the line of view LV from the virtual viewpoint PV being directed to be diagonally downward by approximately 45° with respect to the vertical line. This successfully displays the object B having a certain level of height, such as a pole, while preventing, as much as possible, one or more occupants, who view the surrounding image, from having an uncomfortable feeling.

For example, if the angle of depression $\theta 2$ were excessively smaller than, for example, 20°, a bent of the object B at the joint portion between the first wall plane Mp21 and the bottom plane Mp1 might become prominent, and the object B might seem to be thicker and shorter than an actual size thereof.

Otherwise, if the angle of depression $\theta 2$ were excessively larger than, for example, 70°, the object B might seem to be thinner and longer than the actual size thereof, and bends of the grid lines might become prominent.

Accordingly, it is preferable that the angle of depression $\theta 2$ is set to be within the range from 20° to 70° inclusive.

The image processing apparatus 6 according to the exemplary embodiment is configured to determine the location of the virtual viewpoint PV and the direction of the line of view LV such that at least one characteristic-shape portion of the vehicle V appears in the peripheral field of view of the imaging unit 4. This configuration enables, when one or more occupants view the surrounding image displayed on the screen of the display device 5, the one or more occupants to be likely to recognize which of the graphic polygon of the vehicle V appears in the surrounding image together with the object B. This therefore results in one or more occupants grasping a sense of distance from the vehicle V to the object B more intuitively.

Modifications

While the exemplary embodiment of the present disclosure have been described above, the present disclosure is not limited to the exemplary embodiment. Specifically, the present disclosure includes various modifications and/or alternatives of the exemplary embodiment within the scope of the present disclosure.

The following describes typical modifications of the exemplary embodiment. In the typical modifications, to the same parts or equivalent parts of the exemplary embodiment, like reference characters are assigned, so that, as the descriptions of each of the same or equivalent parts of the typical modifications, the descriptions of the corresponding one of the same or equivalent parts of the exemplary embodiment can be employed unless technical contradiction or otherwise specified.

The present disclosure is not limited to specific applications or specific structures described in the exemplary embodiment.

For example, the present disclosure can be applied to, in addition to motor vehicles that can travel on roads, off-road vehicles, military motor vehicles, passenger drones, or other vehicular devices.

The object detection sensor unit 3 can be eliminated from the vehicular system 1. Specifically, the object information acquiring unit 603 can be configured to acquire, upon determination that the object B is located in the peripheral field of view of the imaging unit 4, positional shape information about the object B from the data items of the peripheral-view images acquired by the image data acquisition unit 601 from the imaging unit 4.

The types of cameras included in the imaging unit 4, the number of cameras included in the imaging unit 4, and the mount locations of cameras, which are included in the imaging unit 4, to the vehicle V can be freely modified. For example, the front-view camera 41 can be arranged in the occupant compartment V0 of the vehicle V.

The image processing apparatus 6 can be provided outside the vehicle V and communicably connected, by radio, to various components of the vehicle V, which include the vehicle condition sensor unit 2, the object detection sensor unit 3, the imaging unit 4, and the display device 5. For example, the image processing apparatus 6 can be installed in an external computer or an external computer assembly wirelessly connected to the various components of the vehicle V.

The functional components of the image processing apparatus 6 illustrated in FIG. 3 are schematic components for describing characteristics of the image processing apparatus 6 according to the exemplary embodiment in recognizable manner. The illustration of FIG. 3 therefore does not limit that the functions components are configured as modules or hardware devices.

Figure 9:
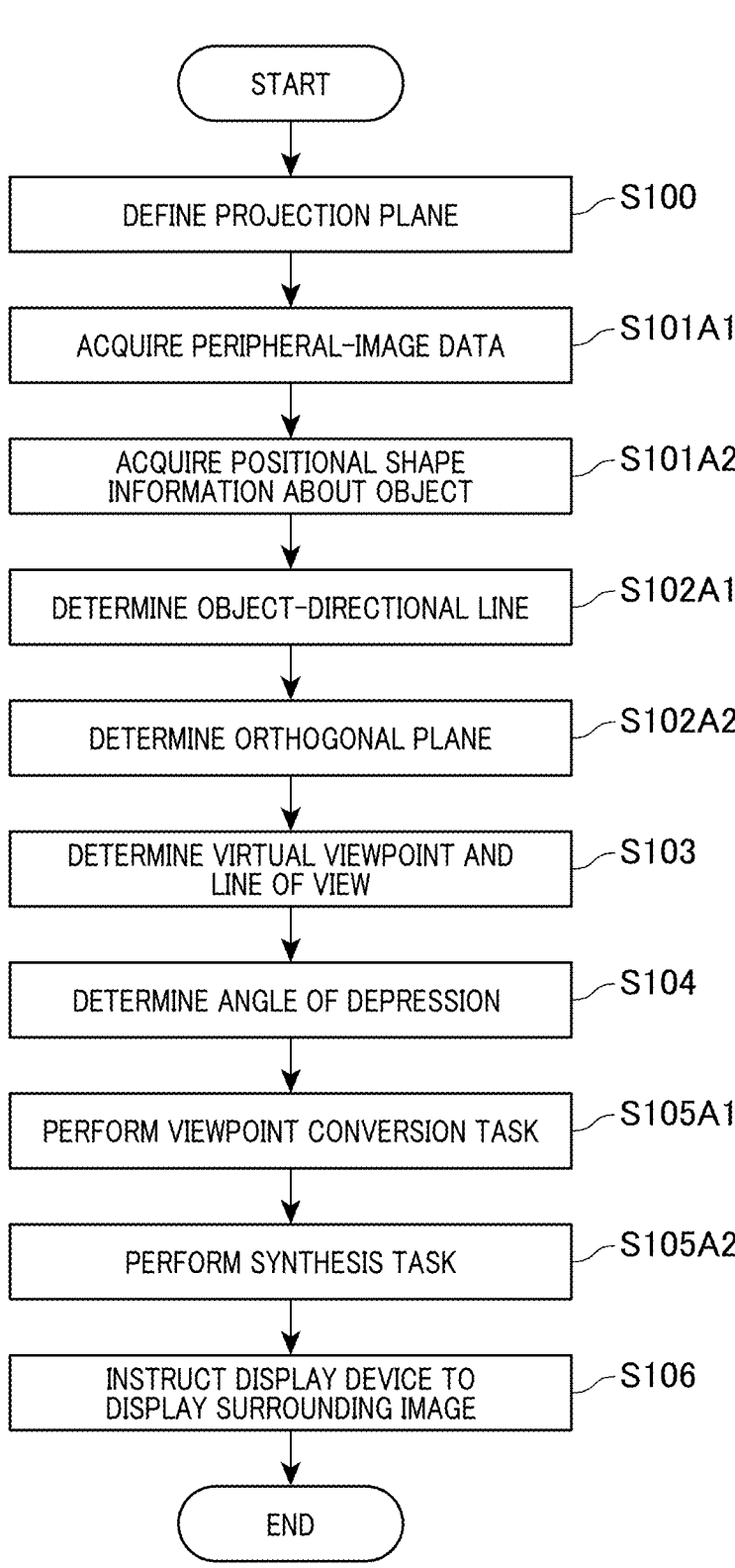
FIG. 9 is a flowchart schematically illustrating a surrounding-image data generating routine executable by a processor of the image processing apparatus.

The computer programs, i.e., computer-program instructions, described in the exemplary embodiment, which cause the processor 61 to execute the operations illustrated in FIG. 9, can be downloaded into the memory device 62 or can be upgraded using vehicle-to-everything (V2X) communications. The computer-program instructions can be downloaded and/or upgraded through terminals and public communications networks; the terminals are provided in, for example, a manufacturing factor of the vehicle V, a garage, or an authorized distributor. The computer programs can be stored in a memory card, an optical disk, or a magnetic disk, accessible to the processor 61 which can read out. That is, the memory card, optical disk, or magnetic disk can serve as the memory device 62.

The various configurations and operations described in the present disclosure can be implemented by a dedicated computer including a memory and a processor programmed to perform one or more functions embodied by one or more computer programs.

The various configurations and operations described in the present disclosure can also be implemented by a dedicated computer including a processor comprised of one or more dedicated hardware logic circuits.

The various configurations and operations described in the present disclosure can further be implemented by a processor system comprised of a memory, a processor programmed to perform one or more functions embodied by one or more computer programs, and one or more hardware logic circuits.

The one or more computer programs can be stored in a non-transitory storage medium as instructions to be carried out by a computer or a processor. One or more functions and operations described in the present disclosure can be implemented as one or more computer programs or a non-transitory storage medium that stores these one or more computer programs.

The present disclosure is not limited to the specific configurations described in the exemplary embodiment.

The processor 61 is configured to generate a bird's-eye image based on the peripheral-view images, i.e., the front-view image, rear-view image, left-side view image, and right-side image, but can be configured to generate a bird's-eye image based on at least one of the peripheral-view images, i.e., at least one of the front-view image, rear-view image, left-side view image, and right-side image.

For example, the 3D projection plane structure Mp according to the exemplary embodiment has a bathtub-like shape in plan view. That is, the line of view LV is orthogonal to the first wall plane Mp21 on the orthogonal plane Mb, but is not always three-dimensionally orthogonal to the first wall plane Mp21, in other words, not always parallel to the normal direction of the first wall plane Mp21. The present disclosure is however not limited to the structure of the 3D projection plane structure Mp.

Specifically, the 3D projection plane structure Mp can be modified to have a bowl-shape or an inverted-dome shape, which is for example disclosed in Japanese Patent Application Publication No. 2011-182059 or Japanese Patent Application Publication No. 2021-118435. An extension of the line of view LV according to this modification is parallel to the normal direction of the first wall plane Mp21, so that the extension of the line of view LV according to this modification becomes the normal line of the first wall plane Mp21.

The vehicle center point Pc is selected as the reference point of the vehicle V according to the exemplary embodiment, but the present disclosure is not limited thereto. Specifically, the reference point of the vehicle V can be modified to be offset from the vehicle center point Pc. For example, the reference point of the vehicle V can be offset from the vehicle center point Pc in a direction toward the location of a selected one of plural objects detected by the object detecting sensor unit 3; the selected one of the plural objects, such as the object B, is the most-watched object. The offset direction of the reference point of the vehicle V and selection of one of the detected objects can be carried out in accordance with the traveling direction of the vehicle V. For example, if the vehicle V is traveling in the forward direction, the reference point of the vehicle V can be offset from the vehicle center point Pc in the forward direction, and one of the detected objects can be selected in the front field of view of the camera 41.

The object-directional line Lb according to the exemplary embodiment is defined as a horizontally extending line connecting between the object B and the reference point of the vehicle V, so that the orthogonal plane Mb according to the exemplary embodiment is the vertical plane orthogonal to the plane of the horizon. The present disclosure is however not limited to the configuration.

Specifically, the object-directional line Lb can be modified as a shortest line connecting between the vehicle V and the object B. Additionally, the object-directional line Lb can be modified as a line overlapping a virtual line connecting between a 3D gravity center of the vehicle V and a 3D gravity center of the object B. In this modification, the object-directional line Lb can be inclined with respect to the plane of the horizon depending on the height of the object B, and therefore, if the orthogonal plane Mb according to this modification is defined as the vertical plane perpendicular to the plane of the horizon, the orthogonal plane Mb can be inclined with respect to the object-directional line Lb. The orthogonal plane Mb according to this modification can be slightly inclined with respect to the vertical plane.

While the vehicle V is traveling in the forward direction, if the location of the virtual viewpoint PV is located behind the vehicle center point Pc, one or more occupants may view the surrounding image displayed on the screen of the display device 5 as if they are looking back towards the object B displayed in the surrounding image.

From this viewpoint, the processor 61 can serve as the visual line determiner 641 to determine, in step S103, the location of the virtual viewpoint PV and the direction the line of view LV from the virtual viewpoint PV in accordance with the traveling direction of the vehicle V. For example, if the vehicle V is traveling in the forward direction, the visual line determiner 641 can be configured to determine, in step S103, the location of the virtual viewpoint PV ahead of the vehicle center point Pc. Additionally, if the vehicle V is traveling in the rearward direction, the visual line determiner 641 can be configured to determine, in step S103, the location of the virtual viewpoint PV behind the vehicle center point Pc. This makes it possible to efficiently reduce an occupant's feeling of discomfort when they view the surrounding image.

One or more components in the exemplary embodiment are not necessarily essential components except for (i) one or more components that are described as one or more essential components or (ii) one or more components that are essential in principle.

Specific values disclosed in the exemplary embodiment, each of which represents the number of components, a physical quantity, and/or a range of a physical parameter, are not limited thereto except that (i) the specific values are obviously essential or (ii) the specific values are essential in principle.

The specific structure and direction of each component described in the exemplary embodiment are not limited thereto except for cases in which (1) the specific structure and direction are described to be essential or (2) the specific structure and direction are required in principle. Additionally, the specific structural or functional relationship between components described in the exemplary embodiment is not limited thereto except for cases in which (1) the specific structural or functional relationship is described to be essential or (2) the specific structural or functional relationship is required in principle.

Additional modifications other than the modifications set forth above can be applied to the disclosure of the exemplary embodiment. The modifications set forth above can be combined with each other. At least part of the exemplary embodiment can be combined with at least part of the modifications set forth above.

The present disclosure includes the following first to twenty-first technological concepts.

The first technological concept is an image processing apparatus (6) installable in a vehicle (V) located on a road surface (Rs). The vehicle includes a display device (5) and an imaging unit (4) having a predetermined peripheral field of view determined around the vehicle. The image processing apparatus includes a memory device (62) that stores computer-program instructions, and a processor (61) configured to execute the computer-program instructions to accordingly (I) Define a three-dimensional virtual projection plane structure (Mp) that includes a bottom plane (Mp1) parallel to the road surface and a wall plane (Mp2) raised to extend from an outer periphery of the bottom plane (II) Determine a location of a virtual viewpoint (PV) above the vehicle on an orthogonal plane (Mb), the orthogonal plane being orthogonal to a virtual line (Lb) connecting between an object (B) located in the peripheral field of view and the vehicle (III) Determine a direction of a line of view (LV) from the virtual viewpoint toward the wall plane (IV) Convert at least one image of the peripheral field of view captured by the imaging unit into a bird's-eye view image being viewed in the line of view (V) Instruct the display device to display the bird's-eye view image thereon In the second technological concept depending from the first technological concept, the wall plane includes a plurality of wall planes, and the processor is configured to determine the direction of the line of view toward a selected one of the plurality of wall planes. The selected one of the plurality of wall planes is located closest to the object in all the plurality of wall planes.

In the third technological concept depending from the first technological concept, the vehicle is traveling in a predetermined direction, and the processor is configured to determine at least one of the location of the virtual viewpoint and the direction of the line of view in accordance with the predetermined direction.

In the fourth technological concept depending from the first technological concept, the processor is configured to determine an angle of depression ($\theta2$) of the line of view from the virtual viewpoint such that the line of view is perpendicular to the wall plane.

In the fifth technological concept depending from the first technological concept, the processor is configured to determine at least one of the location of the virtual viewpoint and the direction of the line of view such that at least part of the vehicle is displayed in the bird's-eye view image.

In the sixth technological concept depending from the fifth technological concept, the at least part of the vehicle includes at least one of (i) a center of the vehicle (Pc), (ii) an outer edge of a body (V1) of the vehicle, (iii) a front bumper (V2) of the vehicle, (iv) a headlight (V3) of the vehicle, (v) a rear bumper (V4) of the vehicle, (vi) a brake lamp (V5) of the vehicle, (vii) a left-side door mirror or a right-side door mirror of the vehicle, and (viii) a driver's seat of the vehicle.

In the seventh technological concept depending from the first technological concept, the processor is configured to determine the orthogonal plane such that the orthogonal plane passes through a middle point of the virtual line connecting between the object located in the peripheral field of view and the vehicle.

The eighth technological concept is an image processing method for a vehicle (V) located on a road surface (Rs). The vehicle includes a display device (5) and an imaging unit (4) having a predetermined peripheral field of view determined around the vehicle. The image processing method includes (I) Defining a three-dimensional virtual projection plane structure (Mp) that includes a bottom plane (Mp1) parallel to the road surface and a wall plane (Mp2) raised to extend from an outer periphery of the bottom plane (II) Determining a location of a virtual viewpoint (PV) above the vehicle on an orthogonal plane (Mb), the orthogonal plane being orthogonal to a virtual line (Lb) connecting between an object (B) located in the peripheral field of view and the vehicle (III) Determining a direction of a line of view (LV) from the virtual viewpoint toward the wall plane (IV) Converting at least one image of the peripheral field of view captured by the imaging unit into a bird's-eye view image being viewed in the line of view (V) Instructing the display device to display the bird's-eye view image thereon In the ninth technological concept depending from the eighth technological concept, the wall plane includes a plurality of wall planes, and the image processing method determines the direction of the line of view toward a selected one of the plurality of wall planes. The selected one of the plurality of wall planes is located closest to the object in all the plurality of wall planes.

In the tenth technological concept depending from the eighth technological concept, the vehicle is traveling in a predetermined direction, and the image processing method determines at least one of the location of the virtual viewpoint and the direction of the line of view in accordance with the predetermined direction.

In the eleventh technological concept depending from the eighth technological concept, the image processing method determines an angle of depression ($\theta 2$) of the line of view from the virtual viewpoint such that the line of view is perpendicular to the wall plane.

In the twelfth technological concept depending from the eighth technological concept, the image processing method determines at least one of the location of the virtual viewpoint and the direction of the line of view such that at least part of the vehicle is displayed in the bird's-eye view image.

In the thirteenth technological concept depending from the twelfth technological concept, the at least part of the vehicle includes at least one of (i) a center of the vehicle (Pc), (ii) an outer edge of a body (V1) of the vehicle, (iii) a front bumper (V2) of the vehicle, (iv) a headlight (V3) of the vehicle, (v) a rear bumper (V4) of the vehicle, (vi) a brake lamp (V5) of the vehicle, (vii) a left-side door mirror or a right-side door mirror of the vehicle, and (viii) a driver's seat of the vehicle.

In the fourteenth technological concept depending from the eighth technological concept, the image processing method determines the orthogonal plane such that the orthogonal plane passes through a middle point of the virtual line connecting between the object located in the peripheral field of view and the vehicle.

The fifteenth technological concept is a program product for a vehicle (V) located on a road surface (Rs). The vehicle includes a display device (5) and an imaging unit (4) having a predetermined peripheral field of view determined around the vehicle. The program product includes a non-transitory storage medium (62) that stores computer-program instructions, and a processor (61) for executing the computer-program instructions stored in the non-transitory storage medium. The computer-program instructions cause the processor to (I) Define a three-dimensional virtual projection plane structure (Mp) that includes a bottom plane (Mp1) parallel to the road surface and a wall plane (Mp2) raised to extend from an outer periphery of the bottom plane (II) Determine a location of a virtual viewpoint (PV) above the vehicle on an orthogonal plane (Mb), the orthogonal plane being orthogonal to a virtual line (Lb) connecting between an object (B) located in the peripheral field of view and the vehicle (III) Determine a direction of a line of view (LV) from the virtual viewpoint toward the wall plane (IV) Convert at least one image of the peripheral field of view captured by the imaging unit into a bird's-eye view image being viewed in the line of view (V) Instruct the display device to display the bird's-eye view image thereon In the sixteenth technological concept depending from the fifteenth technological concept, the wall plane includes a plurality of wall planes, and the computer-program instructions cause the processor to determine the direction of the line of view toward a selected one of the plurality of wall planes. The selected one of the plurality of wall planes is located closest to the object in all the plurality of wall planes.

In the seventeenth technological concept depending from the fifteenth technological concept, the vehicle is traveling in a predetermined direction, and the computer-program instructions cause the processor to determine at least one of the location of the virtual viewpoint and the direction of the line of view in accordance with the predetermined direction.

In the eighth technological concept depending from the fifteenth technological concept, the computer-program instructions cause the processor to determine an angle of depression ($\theta 2$) of the line of view from the virtual viewpoint such that the line of view is perpendicular to the wall plane.

In the ninth technological concept depending from the fifteenth technological concept, the computer-program instructions cause the processor to determine at least one of the location of the virtual viewpoint and the direction of the line of view such that at least part of the vehicle is displayed in the bird's-eye view image.

In the twentieth technological concept depending from the fifteenth technological concept, the at least part of the vehicle includes at least one of (i) a center of the vehicle (Pc), (ii) an outer edge of a body (V1) of the vehicle, (iii) a front bumper (V2) of the vehicle, (iv) a headlight (V3) of the vehicle, (v) a rear bumper (V4) of the vehicle, (vi) a brake lamp (V5) of the vehicle, (vii) a left-side door mirror or a right-side door mirror of the vehicle, and (viii) a driver's seat of the vehicle.

In the twenty-first technological concept depending from the twentieth technological concept, the computer-program instructions cause the processor to determine the orthogonal plane such that the orthogonal plane passes through a middle point of the virtual line connecting between the object located in the peripheral field of view and the vehicle.

The invention claimed is:

1. An image processing apparatus installable in a vehicle located on a road surface, the vehicle including a display device and an imaging unit having a predetermined peripheral field of view determined around the vehicle, the image processing apparatus comprising:

a memory device that stores computer-program instructions; and a processor configured to execute the computer-program instructions to accordingly:

define a three-dimensional virtual projection plane structure that comprises a bottom plane parallel to the road surface and a wall plane raised to extend from an outer periphery of the bottom plane;

determine a location of a virtual viewpoint above the vehicle on an orthogonal plane, the orthogonal plane being orthogonal to a virtual line connecting between an object located in the peripheral field of view and the vehicle;

determine a direction of a line of view from the virtual viewpoint toward the wall plane;

convert at least one image of the peripheral field of view captured by the imaging unit into a bird's-eye view image being viewed in the line of view; and instruct the display device to display the bird's-eye view image thereon.

2. The image processing apparatus according to claim 1, wherein:

the wall plane comprises a plurality of wall planes; and the processor is configured to determine the direction of the line of view toward a selected one of the plurality of wall planes, the selected one of the plurality of wall planes being located closest to the object in all the plurality of wall planes.

3. The image processing apparatus according to claim 1, wherein:

the vehicle is traveling in a predetermined direction; and the processor is configured to determine at least one of the location of the virtual viewpoint and the direction of the line of view in accordance with the predetermined direction.

4. The image processing apparatus according to claim 1, wherein:

the processor is configured to determine an angle of depression of the line of view from the virtual viewpoint such that the line of view is perpendicular to the wall plane.

5. The image processing apparatus according to claim 1, wherein:

the processor is configured to determine at least one of the location of the virtual viewpoint and the direction of the line of view such that at least part of the vehicle is displayed in the bird's-eye view image.

6. The image processing apparatus according to claim 5, wherein:

the at least part of the vehicle includes at least one of:

a center of the vehicle;

an outer edge of a body of the vehicle;

a front bumper of the vehicle;

a headlight of the vehicle;

a rear bumper of the vehicle;

a brake lamp of the vehicle;

a left-side door mirror of the vehicle;

a right-side door mirror of the vehicle; and a driver's seat of the vehicle.

7. The image processing apparatus according to claim 1, wherein:

the processor is configured to determine the orthogonal plane such that the orthogonal plane passes through a middle point of the virtual line connecting between the object located in the peripheral field of view and the vehicle.

8. An image processing method for a vehicle located on a road surface, the vehicle including a display device and an imaging unit having a predetermined peripheral field of view determined around the vehicle, the image processing method comprising:

defining a three-dimensional virtual projection plane structure that comprises a bottom plane parallel to the road surface and a wall plane raised to extend from an outer periphery of the bottom plane;

determining a location of a virtual viewpoint above the vehicle on an orthogonal plane, the orthogonal plane being orthogonal to a virtual line connecting between an object located in the peripheral field of view and the vehicle;

determining a direction of a line of view from the virtual viewpoint toward the wall plane;

converting at least one image of the peripheral field of view captured by the imaging unit into a bird's-eye view image being viewed in the line of view; and instructing the display device to display the bird's-eye view image thereon.

9. A program product for a vehicle located on a road surface, the vehicle including a display device and an imaging unit having a predetermined peripheral field of view determined around the vehicle, the program product comprising:

a non-transitory storage medium that stores computer-program instructions; and a processor for executing the computer-program instructions stored in the non-transitory storage medium, the computer-program instructions causing the processor to:

define a three-dimensional virtual projection plane structure that comprises a bottom plane parallel to the road surface and a wall plane raised to extend from an outer periphery of the bottom plane;

determine a location of a virtual viewpoint above the vehicle on an orthogonal plane, the orthogonal plane being orthogonal to a virtual line connecting between an object located in the peripheral field of view and the vehicle;

determine a direction of a line of view from the virtual viewpoint toward the wall plane;

convert at least one image of the peripheral field of view captured by the imaging unit into a bird's-eye view image being viewed in the line of view; and instruct the display device to display the bird's-eye view image thereon.

* * * * *